US008430971B1

(12) United States Patent
MacDonald

(10) Patent No.: US 8,430,971 B1
(45) Date of Patent: Apr. 30, 2013

(54) COMPOSITION FOR TREATMENT OF A DRILLING FLUID AND ASSOCIATED METHODS

(75) Inventor: John MacDonald, Grant, FL (US)

(73) Assignee: Green Products & Technologies, L.L.C., Melbourne, FL (US)

( * ) Notice: Subject to any disclaimer, the term of this patent is extended or adjusted under 35 U.S.C. 154(b) by 0 days.

(21) Appl. No.: 13/453,871

(22) Filed: Apr. 23, 2012

Related U.S. Application Data

(60) Division of application No. 13/104,180, filed on May 10, 2011, now Pat. No. 8,163,102, and a continuation-in-part of application No. 12/419,379, filed on Apr. 7, 2009, now Pat. No. 7,938,912.

(51) Int. Cl.
*C11D 3/43* (2006.01)

(52) U.S. Cl.
USPC .......... 134/42; 166/261; 166/279; 166/305.1; 166/308.1; 210/638; 210/639; 210/696; 210/698; 210/700

(58) Field of Classification Search .................. 210/638, 210/639, 696, 698, 700, 747.1; 175/65, 66, 175/207; 166/261, 279, 305.1, 308.1; 507/103, 507/129, 140; 134/42
See application file for complete search history.

(56) References Cited

U.S. PATENT DOCUMENTS

| 2,250,379 A | 7/1941 | Johnson |
| 2,485,529 A | 10/1949 | Cardwell |
| 3,920,566 A | 11/1975 | Richardson et al. |
| 3,936,316 A | 2/1976 | Gulla |
| 4,372,870 A | 2/1983 | Snyder et al. |
| 4,466,893 A | 8/1984 | Dill |
| 4,537,684 A | 8/1985 | Gallup et al. |
| 4,673,522 A | 6/1987 | Young |
| 4,699,663 A | 10/1987 | Feeney, III |
| 4,894,169 A | 1/1990 | Delitsky |
| 5,234,466 A | 8/1993 | Sargent et al. |
| 5,492,629 A | 2/1996 | Ludwig et al. |
| 5,672,279 A | 9/1997 | Sargent et al. |
| 7,938,912 B1 * | 5/2011 | MacDonald ................... 134/42 |
| 8,132,628 B2 * | 3/2012 | Sanders et al. ............... 166/400 |
| 8,163,102 B1 * | 4/2012 | MacDonald ................... 134/42 |
| 2006/0063689 A1 | 3/2006 | Netherton |
| 2010/0288909 A1 | 11/2010 | Rosati |

FOREIGN PATENT DOCUMENTS
HU 195241 B 4/1988

* cited by examiner

*Primary Examiner* — Bibi Carrillo
(74) *Attorney, Agent, or Firm* — Carl M. Napolitano; GrayRobinson, P.A.

(57) ABSTRACT

A composition is provided for lowering a pH of a drilling fluid. The composition includes HCl, urea, complex substituted keto-amine-hydrochloride, an alcohol, an ethoxylate, and a ketone. A method of using the composition includes adding the composition to a drilling fluid for a well to assist in lowering a pH thereof. Methods are also provided for performing hydraulic fracturing of an oil or a gas well, for adjusting a pH of a drilling fluid, for adjusting and maintaining a pH of a process fluid, for solubilizing calcium carbonate in an aqueous suspension or dispersion of calcium carbonate, for removing a foulant in a fluid-handling element, and for adjusting a pH and lowering a salt level of turf.

14 Claims, No Drawings

COMPOSITION FOR TREATMENT OF A DRILLING FLUID AND ASSOCIATED METHODS

CROSS-REFERENCE TO RELATED APPLICATION

This application is a Divisional application of U.S. patent application Ser. No. 13/104,180, filed May 10, 2011, which itself is a continuation-in-part of patent application Ser. No. 12/419,379, filed Apr. 7, 2009, now issued U.S. Pat. No. 7,938,912, the disclosures of which are herein incorporated by reference in their entirety, and all commonly owned.

BACKGROUND

The present invention relates to compositions and methods for treating fluids, and, more particularly to such compositions and methods for treating drilling fluids in industrial applications.

TECHNICAL FIELD

The removal of water-insoluble cementitious and lime materials from surfaces is known to be a difficult process. Compositions that have been known for use in the past have included acid (e.g., hydrochloric, hydrofluoric, phosphoric, and sulfuric) washes and urea hydrochloride solutions.

However, the solutions known in the art can cause corrosion and flash rusting to metal and metal alloy surfaces, and also can dissolve away surface coatings and underlying metals. Thus, the use of such compositions can decrease the life of a surface and its coating significantly. For example, when used on vehicles and other industrial and construction equipment, such compositions can greatly increase the frequency at which the treated surfaces must be re-painted, re-coated, or re-sealed.

Additionally, many prior known compositions are not environmentally safe, and contain components that are non-OSHA and -EPA compliant. Some jurisdictions have regulations as to materials that can be drained so as to ultimately reach ground water. Resource Conservation and Recovery Act (RCRA) metals are among those substances that are regulated, and include arsenic, barium, cadmium, chromium, lead, mercury, selenium, and silver. As an example, chromium is often used as a lustrous coating on bumpers, mirrors, hydraulic rams, and trim parts on vehicles such as concrete trucks. Since construction equipment is typically washed outdoors, the resulting process water usually drains directly into the ground, and, thus, if the equipment is coated with an RCRA or other undesirable material that can be released with the washing composition, the material will enter the groundwater.

Therefore, it would be beneficial to provide a composition and method of use that are effective at removing cementitious materials from surfaces without causing corrosion or rusting, which can damage the target surface and release harmful substances such as RCRA materials into the environment. Preferably the composition should also include components that are environmentally safe and OSHA- and EPA-compliant.

It would also be beneficial to provide an environmentally safe composition and method of use that are effective in assisting in performing hydraulic fracturing of an oil gas well, adjusting and maintaining the pH of process water and other fluids in industrial applications, and solubilizing calcium carbonate in an aqueous suspension or dispersion thereof.

SUMMARY

A composition is provided for use in cleaning a surface of a cementitious material. The composition comprises HCl, urea, complex substituted keto-amine-hydrochloride, an alcohol, an ethoxylate, and a ketone.

A method of using the composition includes applying the composition to a surface to release a cementitious material therefrom and removing the composition and released cementitious material from the surface.

The composition comprises an organic, cationic inhibitor for both corrosion and flash rusting that minimizes pitting and attack on metal and alloy surfaces, such as are common in construction equipment and trucks. As the composition is non-corrosive to metals, it has been deemed non-regulated by the U.S. Department of Transportation (DOT), and is environmentally safe and OSHA- and EPA-compliant. The composition has been shown to reduce corrosion levels to well below the DOT corrosion limits of 6.25 mmpy.

In an exemplary embodiment, the inhibitor, which is used at a level of approximately 0.5% in the composition, comprises 10-30% surfactant, 10-30% complex substituted keto-amine-hydrochloride, 1-10% 3-methyl butynol, 1-10% isopropyl alcohol, 1-10% methyl vinyl ketone, and <1% acetone. This inhibitor has been shown to substantially eliminate corrosion of target surfaces.

A method is also provided for performing hydraulic fracturing of oil or gas wells. The method comprises providing a composition comprising HCl, urea, complex substituted keto-amine-hydrochloride, an alcohol, an ethoxylate, and a ketone; and inserting the composition into an oil well or a gas well to assist in performing hydraulic fracturing thereof.

A method is further provided for adjusting a pH of a drilling fluid. The method comprises providing a composition comprising HCl, urea, complex substituted keto-amine-hydrochloride, an alcohol, an ethoxylate, and a ketone; and adding the composition to a drilling fluid for a well to assist in adjusting a pH thereof.

A method for adjusting and maintaining a pH of a process fluid comprises providing a composition comprising HCl, urea, complex substituted keto-amine-hydrochloride, an alcohol, an ethoxylate, and a ketone; and adding the composition to a process fluid to adjust and maintain a pH thereof.

A method for solubilizing calcium carbonate in an aqueous suspension or dispersion of calcium carbonate comprises providing a composition comprising HCl, urea, complex substituted keto-amine-hydrochloride, an alcohol, an ethoxylate, and a ketone; adding the composition to an aqueous suspension or dispersion of calcium carbonate; and permitting the composition to solubilize the aqueous suspension or dispersion of calcium carbonate.

A method for removing a foulant from a fluid-handling element comprises providing a composition comprising HCl, urea, complex substituted keto-amine-hydrochloride, an alcohol, an ethoxylate, and a ketone; adding the composition to a fouled fluid-handling element; and permitting the composition to solubilize the foulant.

A method for removing a foulant from a surface of a marine vessel comprises providing a composition comprising HCl, urea, complex substituted keto-amine-hydrochloride, an alcohol, an ethoxylate, and a ketone; applying the composition to a fouled surface of a marine vessel; and permitting the composition to solubilize the foulant.

A method for lowering a salt and bicarbonate level in an irrigation system comprises providing a composition comprising HCl, urea, complex substituted keto-amine-hydrochloride, an alcohol, an ethoxylate, and a ketone; diluting the composition to 5-60% by volume composition in water; adding the composition to a fouled fluid-transporting element of an irrigation system; and permitting the composition to solubilize the foulant.

A method for acidizing turf and for lowering a salt and bicarbonate level in at least one of turf and turf growing medium comprises providing a composition comprising HCl, urea, complex substituted keto-amine-hydrochloride, an alcohol, an ethoxylate, and a ketone; and adding the composition to at least one of turf and turf growing medium.

DETAILED DESCRIPTION OF PREFERRED EMBODIMENTS

In one preferred embodiment, a composition comprises HCl, urea, complex substituted keto-amine-hydrochloride, at least one alcohol, an ethoxylate, and a ketone. Preferably, the HCl and the urea are present in a range of: HCl, 40-60 wt %, and urea, 30-45 wt %, and, most preferably, at approximately HCl, 55 wt %, and urea, 42 wt %.

Preferably the alcohol comprises at least one of isopropyl alcohol and propargyl alcohol. In a particular embodiment, the isopropyl alcohol and propargyl alcohol are present at approximately isopropyl alcohol, 0.067 wt %, and propargyl alcohol, 0.022 wt %.

The ethoxylate can comprise ethoxylated nonylphenol, which can be present at approximately 0.022 wt %.

The ketone can comprise methyl vinyl ketone, which can present at approximately 0.022 wt %.

In a particular embodiment, the composition can comprise: HCl, 55 wt %; urea, 42 wt %; complex substituted keto-amine-hydrochloride, 0.067 wt %; isopropyl alcohol, 0.067 wt %; ethoxylated nonylphenol, 0.022 wt %; propargyl alcohol, 0.022 wt %; methyl vinyl ketone, 0.022 wt %; acetone, 0.022 wt %; and acetophenone, 0.0022 wt %.

The composition can be used as a base for a plurality of dilution levels to be used for different applications. For example, sufficient water can be added to the composition to dilute the base in a range of 1:1 to 6:1 water:base.

A plurality of exemplary compositions using the composition described above can be used as a base for removing cementitious material from a variety of surfaces. For example, concrete can be removed from equipment with a composition comprising: base (25 wt %), nonylphenol 9.5 mole (0.25 wt %), quaternary ammonium compounds (0.15 wt %), glycol ether EB (0.20 wt %), and water (74.4 wt %). This formula can be used on, for example, ready-mixed concrete, cement, and masonry, although these uses are not intended to be limiting.

Another composition for use as concrete removing agent on equipment can comprise: base (35 wt %), nonylphenol 9.5 mole (0.25 wt %), quaternary ammonium compounds (0.15 wt %), glycol ether EB (0.20 wt %), and water (64.4 wt %). This formula can be used on, for example, ready-mixed concrete, cement, and masonry, although these uses are not intended to be limiting.

Yet another composition can be used as an efflorescence remover on cementitious materials (concrete block, brick, precast, paver, cement, and masonry). An exemplary formula for this composition is: base (15 wt %), nonylphenol 9.5 mole (0.25 wt %), quaternary ammonium compounds (0.15 wt %), glycol ether EB (0.20 wt %), and water (84.4 wt %). This formula can be used on, for example, concrete block, brick, precast, cement, and masonry, although these uses are not intended to be limiting.

A basic composition for use as a concrete removing agent on tools and equipment includes base (25 wt %) and water (75 wt %). This formula can be used on, for example, ready-mixed concrete, cement, and masonry, although these uses are not intended to be limiting.

Another composition for use as a concrete removing agent on equipment comprises base (60.0 wt %), nonylphenol 9.5 mole (0.25 wt %), quaternary ammonium compounds (0.15 wt %), glycol ether EB (0.20 wt %), and water (39.4 wt %). This formula can be used on, for example, ready-mixed concrete, cement, and masonry, although these uses are not intended to be limiting.

A method for performing hydraulic fracturing of an oil or a gas well comprises providing a composition such as that described above and inserting the composition into an oil well or a gas well to assist in performing hydraulic fracturing thereof.

A method for adjusting a pH of a drilling fluid comprises providing a composition such as described above and adding the composition to a drilling fluid for a well to assist in adjusting a pH thereof. The composition can be diluted to 20-90% by volume composition in water.

A method for adjusting and maintaining a pH of a process fluid comprises providing a composition such as described above and adding the composition to a process fluid to adjust and maintain a pH thereof. The process fluid can comprise at least one of a processing fluid for textiles, a processing fluid for paper manufacturing, industrial process water, waste water, industrial discharge water, and industrial recycling water. The composition can be diluted by 10-85% by volume composition in water, for example.

A method for solubilizing calcium carbonate in an aqueous suspension or dispersion of calcium carbonate comprises providing a composition such as described above and adding the composition to an aqueous suspension or dispersion of calcium carbonate. The composition is permitted to solubilize the aqueous suspension or dispersion of calcium carbonate. The composition can be diluted by 10-95% by volume composition in water, for example.

A method for removing a foulant from a fluid-handling element comprises providing a composition comprising HCl, urea, complex substituted keto-amine-hydrochloride, an alcohol, an ethoxylate, and a ketone; adding the composition to a fouled fluid-handling element; and permitting the composition to solubilize the foulant.

In one sub-embodiment, the fluid-handling element can comprise a waste plumbing system and the foulant can comprise a salt of at least one of calcium and magnesium. In this embodiment the composition can be diluted prior to the adding step to 10-65% by volume composition in water.

In another sub-embodiment, the fluid-handling element can comprise an industrial boiler system and the foulant can comprise a salt of at least one of calcium and magnesium. In this embodiment the composition can be diluted prior to the adding step by 5-70% by volume composition in water.

In a further sub-embodiment, the fluid-handling element can comprise a plumbing element of a marine vessel and the foulant can comprise at least one of a salt of at least one of calcium and magnesium, a marine organism such as arthropods such as cirripedia or crustaceans, and sludge. In this embodiment the composition can be diluted prior to the adding step by 5-80% by volume composition in water. Here the plumbing element can comprises a waste plumbing element, and the diluting can comprise diluting the composition by 10-65% by volume composition in water. The plumbing element can also comprise an internal plumbing element, and the diluting can comprise diluting the composition by 5-50% by volume composition in water. Alternatively, the plumbing element can comprise an element in a propulsion system, such as, but not intended to be limited to, inboard, outboard, inboard/outboard, surface drive, or jet drive propulsion engine systems, and the diluting can comprise diluting the composition by 5-80% by volume composition in water.

A method for removing a foulant from a surface of a marine vessel comprises providing a composition comprising HCl, urea, complex substituted keto-amine-hydrochloride, an alcohol, an ethoxylate, and a ketone; applying the composition to a fouled surface of a marine vessel; and permitting the composition to solubilize the foulant. The surface can comprise, for example, a marine hull. If desired, the composition can be diluted by 5-95% by volume composition in water. The foulant can comprise at least one of a salt of at least one of calcium and magnesium, a marine organism such as arthropods such as cirripedia or crustaceans, and sludge.

A method for lowering a salt and bicarbonate level in an irrigation system comprises providing a composition comprising HCl, urea, complex substituted keto-amine-hydrochloride, an alcohol, an ethoxylate, and a ketone; diluting the composition to 5-60% by volume composition in water; adding the composition to a fouled fluid-transporting element of an irrigation system; and permitting the composition to solubilize the foulant.

A method for acidizing turf and for lowering a salt and bicarbonate level in at least one of turf and turf growing medium comprises providing a composition comprising HCl, urea, complex substituted keto-amine-hydrochloride, an alcohol, an ethoxylate, and a ketone; and adding the composition to at least one of turf and turf growing medium. The composition can be diluted to 1-35% by volume composition in water.

One of skill in the art will recognize that these compositions and methods of use are not intended to be limiting, and variations in ingredients, proportions, and methods of use can be made without departing from the spirit of the invention.

Having now described the invention and use of preferred embodiments thereof, and the advantageous new and useful results obtained thereby, the new and useful constructions, and reasonable equivalents thereof obvious to those skilled in the art, are set forth in the appended claims.

What is claimed is:

1. A method for lowering a pH of a drilling fluid, the method comprising:
    providing a composition comprising HCl, urea, complex substituted keto-amine-hydrochloride, an alcohol, an ethoxylate, and a ketone; and
    adding the composition to a drilling fluid for a well to assist in lowering a pH thereof.

2. The method recited in claim 1, wherein the alcohol comprises at least one of isopropyl alcohol and propargyl alcohol.

3. The method recited in claim 1, wherein the ethoxylate comprises ethoxylated nonylphenol.

4. The method recited in claim 1, wherein the ketone comprises methyl vinyl ketone.

5. The method recited in claim 1, wherein the composition comprises:
    HCl, 55 wt %;
    urea, 42 wt %;
    complex substituted keto-amine-hydrochloride, 0.067 wt %;
    isopropyl alcohol, 0.067 wt %;
    ethoxylated nonylphenol, 0.022 wt %;
    propargyl alcohol, 0.022 wt %; methyl vinyl ketone, 0.022 wt %;
    acetone, 0.022 wt %; and
    acetophenone, 0.0022 wt %.

6. The method recited in claim 1, wherein the composition providing step comprises providing the composition during hydraulics fracturing of at least one of an oil well and a gas well.

7. The method recited in claim 5, further comprising diluting the composition to 20-90% by volume composition in water.

8. A method for adjusting and maintaining a pH of a process fluid, the method comprising:
    providing a composition comprising HCl, urea, complex substituted keto-amine-hydrochloride, an alcohol, an ethoxylate, and a ketone; and
    adding the composition to a process fluid to adjust and maintain a pH thereof.

9. The method recited in claim 8, wherein the alcohol comprises at least one of isopropyl alcohol and propargyl alcohol.

10. The method recited in claim 8, wherein the ethoxylate comprises ethoxylated nonylphenol.

11. The method recited in claim 8, wherein the ketone comprises methyl vinyl ketone.

12. The method recited in claim 8, wherein the composition comprises:
    HCl, 55 wt %;
    urea, 42 wt %;
    complex substituted keto-amine-hydrochloride, 0.067 wt %;
    isopropyl alcohol, 0.067 wt %;
    ethoxylated nonylphenol, 0.022 wt %;
    propargyl alcohol, 0.022 wt %; methyl vinyl ketone, 0.022 wt %;
    acetone, 0.022 wt %; and
    acetophenone, 0.0022 wt %.

13. The method recited in claim 8, wherein the process fluid comprises at least one of a processing fluid for textiles, a processing fluid for paper manufacturing, industrial process water, waste water, industrial discharge water, and industrial recycling water, and further comprising diluting the composition prior to the adding step by 10-85% composition in water.

14. The method recited in claim 8, wherein the composition providing step comprises providing the composition during a hydraulics fracturing of at least one of an oil well and a gas well.

* * * * *